US007016576B2

(12) United States Patent
Cocchini et al.

(10) Patent No.: US 7,016,576 B2
(45) Date of Patent: Mar. 21, 2006

(54) METHOD FOR PRODUCING AN OPTICAL FIBRE TELECOMMUNICATIONS CABLE WITH REDUCED POLARIZATION MODE DISPERSION

(75) Inventors: Franco Cocchini, Cava Dei Tirreni (IT); Andrea Mazzotti, Rende (IT); Alfonso Cavallaro, Battipaglia (IT); Francesco Di Nola, Sant' Antonio Abate (IT)

(73) Assignee: Pirelli S.p.A., Milan (IT)

( * ) Notice: Subject to any disclaimer, the term of this patent is extended or adjusted under 35 U.S.C. 154(b) by 260 days.

(21) Appl. No.: 10/451,998

(22) PCT Filed: Dec. 14, 2001

(86) PCT No.: PCT/EP01/14760

§ 371 (c)(1),
(2), (4) Date: Nov. 13, 2003

(87) PCT Pub. No.: WO02/053117

PCT Pub. Date: Jul. 11, 2002

(65) Prior Publication Data
US 2004/0081412 A1   Apr. 29, 2004

(30) Foreign Application Priority Data
Dec. 28, 2000 (EP) .................................. 00128599

(51) Int. Cl.
*G02B 6/16* (2006.01)
*G02B 6/44* (2006.01)
*C03C 25/10* (2006.01)
*C03B 37/02* (2006.01)

(52) U.S. Cl. .......................... 385/104; 385/11; 65/430; 65/435; 65/438; 65/475

(58) Field of Classification Search .................. None
See application file for complete search history.

(56) References Cited

U.S. PATENT DOCUMENTS

| 4,480,897 A | 11/1984 | Okamoto et al. |
| 4,902,097 A | 2/1990 | Worthington et al. |
| 4,950,047 A | 8/1990 | Berkey et al. |
| 4,969,941 A | 11/1990 | Kyoto et al. |
| 5,298,047 A | 3/1994 | Hart, Jr. et al. |
| 5,366,527 A | 11/1994 | Amos et al. |
| 5,482,525 A | 1/1996 | Kajioka et al. |
| 5,539,849 A * | 7/1996 | Petisce ................. 385/102 |

(Continued)

FOREIGN PATENT DOCUMENTS

EP   0 630 865 A1   12/1994

(Continued)

OTHER PUBLICATIONS

Rashleigh, S. C., "Origins and Control of Polarization Effects in Single-Mode Fibers", Journal of Lightwave Technology, vol. LT-1, No. 2, pp. 312-331, (Jun. 1983).

(Continued)

*Primary Examiner*—Michelle Connelly-Cushwa
(74) *Attorney, Agent, or Firm*—Finnegaon, Henderson, Farabow, Garrett & Dunner, L.L.P.

(57) ABSTRACT

An optical cable for telecommunications having an optical core and a plurality of protecting and reinforcing elements or avers placed around the optical core. The optical core has a central reinforcing element, a polymer layer, a plurality of optical fibers incorporated in the polymer layer and a thin sheath which covers the polymer layer. The optical fibers have an alternating spin about their own axes with a maximum value of at least 4 twists per meter, and a core having a mean ellipticity in the range of 0.25 to 0.55, in such a way that the effects of birefringence of the fibers caused by the cabling process are significantly reduced.

20 Claims, 6 Drawing Sheets

U.S. PATENT DOCUMENTS

| | | | |
|---|---|---|---|
| 5,558,692 A * | 9/1996 | Chervenak et al. | 65/382 |
| 5,704,960 A | 1/1998 | Evans et al. | |
| 5,822,487 A * | 10/1998 | Evans et al. | 385/123 |
| 5,867,616 A | 2/1999 | Antos et al. | |
| 5,943,466 A | 8/1999 | Henderson et al. | |
| 6,327,876 B1 * | 12/2001 | Cocchini et al. | 65/430 |
| 6,920,270 B1 * | 7/2005 | Galtarossa et al. | 385/123 |
| 2002/0031292 A1 * | 3/2002 | Dyott et al. | 385/11 |
| 2002/0178758 A1 * | 12/2002 | Cocchini et al. | 65/378 |

FOREIGN PATENT DOCUMENTS

| | | |
|---|---|---|
| EP | 0 646 819 A1 | 4/1995 |
| EP | 0 842 909 B1 | 5/1998 |

OTHER PUBLICATIONS

Payne, D. N. et al., "Development of Low- and High-Birefringence Optical Fibers", IEEE Journal of Quantum electronics, vol. QE-18, No. 4, pp. 477-488, (Apr. 1982).

Tardy, A. et al., "Fiber PMD Analysis for Optical-Fiber Cable Using Polarization OTDR", OFC '95 Technical Digest, pp. 236-238, (1995).

Agrawal, G. P., "Fiber-Optic Communication Systems", Second Edition, pp. 34-37, John Wiley & Sons, Inc., New York.

* cited by examiner

METHOD FOR PRODUCING AN OPTICAL FIBRE TELECOMMUNICATIONS CABLE WITH REDUCED POLARIZATION MODE DISPERSION

CROSS REFERENCE TO RELATED APPLICATIONS

This application is a national phase application based on PCT/EP01/14760, filed Dec. 14, 2001, the content of which is incorporated herein by reference, and claims the priority of European Patent Application No. 00128599.8, filed Dec. 28, 2000, and claims the benefit of U.S. Provisional Application No. 60/259,209, filed Jan. 3. 2001.

BACKGROUND OF THE INVENTION

1. Field of the Invention

The present invention relates to an optical fibre telecommunications cable with reduced polarization mode dispersion, and to the corresponding method of production. The present invention also relates to an optical fibre suitable for use in an optical fibre telecommunications cable, and to the corresponding method of production.

2. Description of the Related Art

As is known from "Fiber-Optic Communication Systems", Govind Agrawal, John Wiley and Sons, Inc., Second edition, a single mode optical fibre with a perfectly symmetrical core and of uniform diameter permits the transmission of two degenerate orthogonal modes (typically known as TE and TM), having the same value of mode index (or effective index) n, defined as $n=\beta/k_0$, where $\beta$ is the propagation constant and $k_0$ is the free space wave number.

The cylindrical symmetry of the core can be interrupted by variations in the shape of the core, originating for example during the process of drawing the fibre.

The process of drawing an optical fibre is usually carried out by means of an appropriate apparatus known as a "drawing tower", from a suitably prepared glass preform. In practice, the preform is placed in a vertical position in a furnace where a lower portion of the preform is heated to a temperature above the softening point. The material flowing from the preform is drawn downwards at a controlled rate in such a way as to produce a filamentary element which forms the optical fibre. In this process, variations of shape in the core of the fibre can be due, for example, to structural and geometrical defects in the preform, or to undesired variations of the operating conditions of the process.

Owing to the aforesaid variations of shape of the fibre core, the optical properties along two orthogonal axes x and y in a section of the core become different, and the fibre acquires birefringence. If $n_x$ and $n_y$ are the mode indices for the modes polarized along the two Cartesian axes x and y, the birefringence is given by $B=|n_x-n_y|$.

When an optical signal passes through a birefringent fibre, a phenomenon known as the "polarization mode dispersion" (PMD) occurs, and this causes the two modes with orthogonal polarization to be propagated at different phase and group velocities. In the case of pulsed signals, the PMD typically causes a spreading of the pulses. This is because, if an incoming pulse excites both polarization components, the two components are dispersed along the fibre as a result of their different group velocities, and the pulse leaving the fibre becomes wider.

The phenomenon of PMD usually gives rise to a limitation of the signal transmission bandwidth and, consequently, a degradation of the performance of the optical fibres. This phenomenon is therefore undesired in optical fibre telecommunications systems, especially in long-distance systems, in which it is necessary to minimize all kinds of attenuation or dispersion of the signals in order to provide high performance in transmission and reception.

Typically, the phenomenon of PMD increases in a linear way with the length of the fibre. However, longitudinal imperfections and irregularities in the fibre produce an exchange of power between the two polarization modes, giving rise to the phenomenon of "mode couplings". Owing to this phenomenon, the delay between the two polarization modes varies, along the axis of the fibre, in a slower way, particularly in proportion to the square root of the distance travelled.

The mode coupling can also be imposed deliberately by suitable methods, for example by the method of "spinning" the fibre during drawing, which consists in imparting to the fibre a predetermined spin about its axis, as described for example in U.S. Pat. No. 5,298,047 in the name of AT&T Bell Laboratories. The spinning method makes it possible to reduce the PMD of a single mode fibre to less than 0.1 ps/km$^{1/2}$. Values of this order of magnitude are usually requested from fibre manufacturers by those constructing telecommunications systems. The acceptable values of PMD can, however, vary according to other system parameters, particularly the transmission rate and the length of the links.

The spinning method can also be used in the process of producing doped fibres for use in optical amplifiers, as described in U.S. Pat. No. 5,704,960 in the name of Corning, but in order to reduce two phenomena present in this type of fibre, known as "Polarization Hole-Burning" (PHB) and "Polarization-Dependent Gain" (PDG). Also according to U.S. Pat. No. 5,704,960, in order to clearly define the requisite spin and the reversing length of the fibre (in other words, the distance between two reverses of the direction of spin present in an alternating spin), the fibre can be fabricated with a finite birefringence by ellipticity or stress. This finite birefringence must be capable of predominating over the unintentional birefringence introduced during the fabrication process.

The applicant observes that, although U.S. Pat. No. 5,704,960 does not specify quantitative values of the finite birefringence to be applied, it is necessary to have a high ellipticity of the fibre in order to obtain a birefringence capable of predominating over the unintentional birefringence (and therefore considerably larger than the unintentional birefringence). In particular, the applicant considers that the requisite ellipticity is such that there is an increased complexity and cost of the processes of producing the fibre and assembling the telecommunications system. This is because, in the production process, if the fibre has to be made with a high ellipticity, the control of the optical specifications of the fibre is inevitably less precise. This is due to the fact that, in the fibre production process, which is a complicated process because it has several degrees of freedom, it is also necessary to allow for the high ellipticity of the fibre and its effect on the other process parameters. Moreover, during the assembly of the telecommunications system, if the ellipticity of the fibre is high, the correct joining of the fibres becomes difficult and requires complex and expensive equipment.

Usually, the optical fibres for signal transmission are cabled after the drawing process. Typically, the cabling process comprises the production, by an extrusion process, of a polymer body containing the optical fibres, followed by the application of external protective and reinforcing layers and elements.

In cables known as "tight" cables, the optical fibres are incorporated directly, together with a central supporting element, into the polymer body. In cables known as "loose", a plurality of tubular bodies of polymer material, arranged around a central element and each containing a plurality of optical fibres, are placed within an outer tubular body which is also made from polymer material.

The aforesaid cabling operations comprise, particularly for "tight" cables, the application of non-uniform forces to the optical fibres, and consequently the generation of contributions to birefringence due to lateral pressure or elastic spinning of the fibres.

In greater detail, the applicant has observed that, during the different steps of the cabling process, radial stresses are induced within the cable, which stresses extend throughout the length of the cable and, particularly in "tight" cables, can cause lateral deformations of the optical fibres. For example, at the end of the extrusion process, tensions can be "frozen" into the polymer body, giving rise to a state of continuous radial stress. Similar effects are caused by the contraction ("shrinkage") of the extruded material during the cooling which follows the extrusion process.

Other stress contributions can be created by the radial stress generated in subsequent steps of processing, as in the step of pressurizing the polymer body containing the fibres or during the normal application of a polyethylene sheath around the polymer body.

Although these stress states are usually distributed uniformly in the angular direction, there is a non-uniform deformation of the optical fibres (and therefore an increase in birefringence), since the optical fibres are not positioned along the axis of the cable.

Moreover, the birefringence can increase as a result of the ovalization of the outer reinforcing and protective coverings. In this case, the stresses act radially but are not uniformly distributed in the angular direction, since they act predominantly on the lateral portion of the cable in which the deformations are concentrated. These stresses can act on the optical fibres in a continuous or periodic way, depending on whether the fibres are placed parallel to each other or are wound (in a cylindrical helix) around the central element. In the latter case, the effect of the stresses can depend on the periodicity of the winding of the optical fibres.

The variations in shape to which the cores of the optical fibres are subjected by the cabling process therefore contribute to influence the performance of the fibres in terms of PMD.

The applicant has observed that, although the spinning method applied in the course of drawing is effective in reducing the PMD caused by intrinsic defects generated in the course of drawing, it is not so effective in reducing the PMD caused by the effects of cabling. This :is primarily due to the fact that the contributions of birefringence due to cabling are usually deterministic, since they are not orientated in a random way, and therefore the PMD of a cabled fibre is generally difficult to predict. To overcome this disadvantage, particular attention is paid in the prior art to the design and construction of the cable, in order to cause the smallest possible stress on the fibres.

U.S. Pat. No. 5,867,616 in the name of Corning Incorporated proposes a method for controlling the PMD in a way which is fully independent of the processes carried out after the drawing process, for example the process of "buffering" (in other words the application of a secondary protective covering, which can be "loose" or "tight") and the cabling process. This patent proposes that a coupling of the polarization modes within the fibre be produced, by causing periodic variations of ellipticity of the core, of concentricity between the core and the cladding, or of residual stress in the fibre. These variations are produced in such a way that their planes of symmetry are orthogonal to each other in adjacent segments of fibre which are essentially of the same length. The resulting net birefringence is therefore zero.

The applicant observes that, in U.S. Pat. No. 5,867,616, the deliberately induced birefringence has to be of sufficient extent that it can eliminate, by itself, the effects of birefringence due to the cabling and "buffering" processes. The applicant has calculated that the variation of the refractive index of birefringence due to the cabling process is usually less than $3 \times 10^{-7}$, and therefore notes that a deliberately introduced variation of the refractive index such as that proposed in U.S. Pat. No. 5,867,616, in other words one of at least $1 \times 10^{-6}$, is much greater than the variation of the refractive index of birefringence arising from the cable production process. The applicant considers that the modifications required to introduce this level of birefringence can give rise to greater complexity or cost in the fibre production process and at the stage of assembly of the telecommunications system, for the reasons discussed previously with reference to U.S. Pat. No. 5,704,960.

The applicant has addressed the problem of providing a method which reduces the aforesaid disadvantages due to the cabling process, without giving rise to significant complication or increases in cost in the fibre and cable fabrication process or at the stage of assembly of the telecommunications system.

SUMMARY OF THE INVENTION

The applicant has found that, by producing optical fibres with a core ellipticity and a spin within predetermined limits, it is possible to significantly reduce the aforesaid disadvantages due to the cabling process, without causing a significant increase in costs or complexity in the processes of fabrication of the optical fibres and of the optical cables or at the stage of assembling the telecommunications system, and without significantly perturbing other characteristic parameters of the fibres.

The ellipticity of the core is made to be essentially uniform along the fibre, and its mean value has to lie between a lower limit, chosen in such a way that the birefringence associated with it is at least equal to the birefringence due to cabling (in such a way that it can oppose the effects of the latter), and an upper limit, chosen so that it does not exceed a value beyond which there would be significant effects on the aforesaid fabrication and assembly processes or on the characteristic parameters of the fibres. In practice, in particular, the applicant has found that the aforesaid advantages are present when the mean core ellipticity is in the range from approximately 0.25 to 0.55, preferably from approximately 0.3 to 0.5, more preferably from approximately 0.35 to 0.5, and even more preferably from approximately 0.35 to 0.45.

The spin to be applied to the fibre during drawing is preferably alternating, and the limits of the maximum spin are to be selected in such a way that there is sufficient modal coupling to oppose the effects of the intrinsic birefringence of the fibre introduced by an ellipticity of the core within the limits indicated above. The applicant considers that, for the aforesaid purpose, the spin must be at least 4 twists per meter, preferably at least 5 twists per meter, more preferably at least 6 twists per meter, and even more preferably at least 10 twists per meter. The applicant has also noticed that above 30 twists per meter it becomes difficult to apply the spin by the spinning method at convenient drawing velocities (particularly at velocities exceeding 10 m/s).

The applicant has verified that the proposed method makes it possible to obtain an optical cable in which the birefringence of the individual fibres is practically unchanged from the intrinsic birefringence of the fibres before cabling. The PMD of the optical cable is therefore low and predictable.

In a first aspect, the present invention relates to an optical cable for telecommunications, comprising an optical core housing a plurality of optical fibres, in which at least one of the said optical fibres has a spin about its own axis with a maximum value of at least 4 twists per meter, and comprises a core having a mean ellipticity in the range from approximately 0.25 to 0.55, preferably from approximately 0.3 to 0.5, more preferably from approximately 0.35 to 0.5, and even more preferably from approximately 0.35 to 0.45.

Preferably, the optical core comprises a body of polymer material incorporating the said at least one of the said optical fibres.

Advantageously, the cable comprises reinforcing elements arranged around the said optical core and at least one protective layer placed around the said reinforcing elements.

In a further aspect, the present invention relates to an optical cable for telecommunications, comprising an optical core housing a plurality of optical fibres, in which at least one of the said optical fibres has a predetermined spin about its own axis and comprises a core having a mean ellipticity of at least 0.25, the said spin and the said mean ellipticity being such that the PMD of the fibre is less than or equal to approximately 0.2 ps/km$^{1/2}$.

In a further aspect, the present invention relates to a method for making an optical cable for telecommunications, comprising the steps of:
  producing at least one optical fibre, which in turn comprises the steps of making at least one preform of glass material and drawing the said at least one optical fibre from the said at least one preform;
  making a body of polymer material containing the said at least one optical fibre;

in which the said step of producing at least one preform comprises the adjustment of process parameters in such a way that the said preform has, in an inner portion thereof, a mean ellipticity in the range from 0.25 to 0.55, and the said step of drawing the said optical fibre comprises the step of imparting to the said optical fibre a spin, preferably alternating, having a maximum value of at least 4 twists per meter.

The said step of making the said preform preferably comprises the step of depositing chemical substances on a cylindrical support rotating about its own axis, and the said step of adjusting process parameters preferably comprises the step of varying the velocity of rotation of the said cylindrical support in a periodic way.

This method preferably also comprises the step of making at least one protective and/or reinforcing element outside the said body of polymer material.

In a further aspect, the present invention relates to a method for making an optical cable for telecommunications, comprising the steps of:
  producing at least one optical fibre, which in turn comprises the steps of making at least one preform of glass material and drawing the said at least one optical fibre from the said at least one preform;
  making a body of polymer material containing the said optical fibre;

in which the said step of producing at least one preform comprises the adjustment of process parameters in such a way that the said preform has, in an inner portion thereof, a mean ellipticity of at least 0.25, and the said step of drawing the said optical fibre comprises the step of imparting a predetermined spin to the said optical fibre, the said mean ellipticity and the said spin being such that the PMD of the said optical fibre is less than or equal to approximately 0.2 ps/km$^{1/2}$.

In a further aspect, the present invention relates to an optical fibre suitable for use in an optical cable, comprising a core for the transmission of optical signals and a cladding formed around the said core, in which the fibre has a spin about its own axis with a maximum value of at least 4 twists per meter and in which the said core has a mean ellipticity in the range from 0.25 to 0.55, preferably from approximately 0.3 to approximately 0.5, more preferably from approximately 0.35 to approximately 0.5, and even more preferably from approximately 0.35 to 0.45.

In a further aspect, the present invention relates to a method for making an optical fibre suitable for use in an optical cable, comprising the steps of producing a preform of glass material and of drawing the said optical fibre from the said preform, in which the said step of producing the said preform comprises the step of adjusting process parameters in such a way that the said preform has, in an inner portion thereof, a mean ellipticity in the range from approximately 0.25 to approximately 0.55, and the said step of drawing the said optical fibre comprises the step of imparting to the said optical fibre a spin, preferably alternating, having a maximum value of at least 4 twists per meter.

Advantageously, the said step of producing the said preform comprises depositing chemical substances on a cylindrical support rotating about its own axis, and the said step of adjusting process parameters preferably comprises the step of varying the velocity of rotation of the said cylindrical support in a periodic way.

Preferably, the said step of producing a preform comprises executing an OVD process.

The said spin has a maximum value which is preferably equal to at least 5, more preferably equal to at least 6 twists per meter, and even more preferably equal to at least 10 twists per meter.

BRIEF DESCRIPTION OF THE DRAWINGS.

The invention is described in detail below with reference to the attached figures, which show a non-restrictive example of application. In particular.

DETAILED DESCRIPTION OF THE INVENTION.

Figure 1:
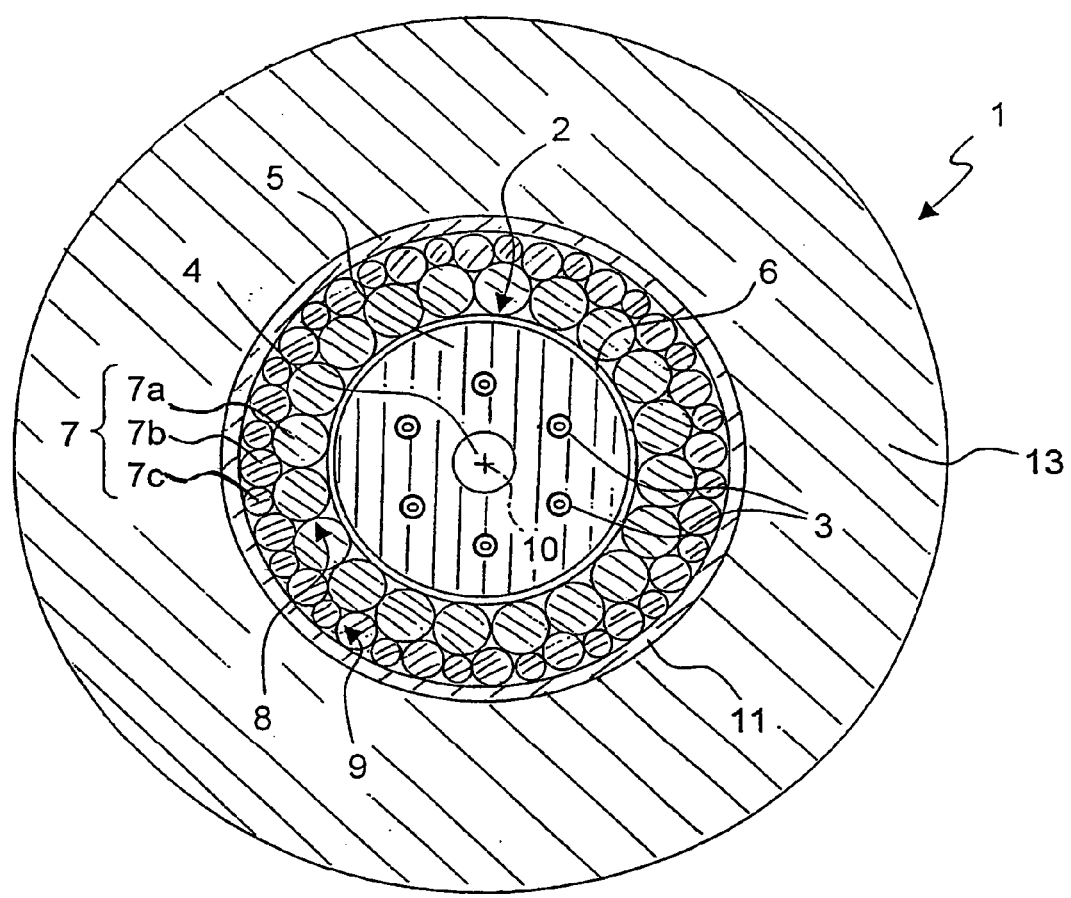
FIG. 1 shows, in cross section and not to scale, an optical telecommunications cable made according to the present invention.

FIG. 1 shows, in section, an underwater optical cable 1 for telecommunications, of the type usually called "tight", because the optical fibres are directly incorporated in a body of polymer material. Alternatively, the cable could be of the type comprising a plurality of optical fibres housed in a "loose" way, in other words with freedom to move, within tubular bodies of polymer material, which in turn are placed within a further tubular body of greater size which is also made from polymer material.

The cable 1 has an axis 10 and comprises a central, essentially cylindrical, optical core 2, and preferably a plurality of protective and/or reinforcing layers and/or elements 7, 11 and 13 around this core.

The optical core 2, described in detail below with reference to FIG. 2, comprises a body 5 of polymer material and a plurality of optical fibres 3 (numbering six in the particular example shown), incorporated in the body 5. The optical core 2 preferably also comprises a central reinforcing element 4 which is also incorporated in the body 5, and a thin sheath 6 which covers the body 5 and is made from a thermoplastic polymer. The external diameter of the optical core 2 is preferably less than 4 mm.

Preferably, a plurality of reinforcing elements 7a, 7b and 7c, preferably comprising steel filamentary elements wound in a cylindrical helix, is present around the sheath 6. In the example of FIG. 1, this plurality of reinforcing elements comprises:

first group of reinforcing elements 7a having a first diameter and placed in contact with each other to create a self-supporting structure which forms a first reinforcing layer 8 outside the sheath 6 and not in contact with the latter;

a second group of reinforcing elements 7b having a second diameter, smaller than the first, and placed outside the elements of the first group 7a; and a third group of reinforcing elements 7c having a third diameter, smaller than the second, and placed outside the elements of the first group 7a and alternating with the elements of the second group 7b in such a way as to form, together with the latter, a second reinforcing layer 9 outside the reinforcing layer 8.

The reinforcing elements 7c are placed in angular positions corresponding to those of the reinforcing elements 7a in such a way that the second reinforcing layer 9 has an essentially cylindrical external envelope which is tangent to both the reinforcing elements 7b and the reinforcing elements 7c.

The set of two reinforcing layers 8 and 9 forms a structure known in the art as the "Warrington" structure.

There may be a tubular covering 11 around the reinforcing elements 7b, 7c of the second reinforcing layer 9, and this covering, together with the aforesaid "Warrington" structure, forms a reinforcing structure having mechanical characteristics such that it imparts to the cable 1 a high resistance to mechanical stresses, particularly to the hydrostatic pressure present in deep waters. The tubular covering 11 is preferably made from metallic material, more preferably from copper. The covering 11 also forms an electrically conducting element which can be used for supplying electricity to the signal repeaters located in the telecommunications system of which the cable 1 forms part. Finally, the covering 11 protects the inner parts from moisture.

Alternatively, the reinforcing elements can be placed in other configurations, in one or more rows, according to the conditions of use.

The cable 1 can also comprise a layer 13 of polymer material, preferably polyethylene, placed outside the covering 11 and capable of electrically insulating the covering 11 and the Warrington structure from the exterior.

In the absence of further coverings, the external diameter of the layer 13 is also the external diameter of the cable 1. The layer 13 can, if necessary, be protected by a metallic tape covering (not shown) and by one or more coverings of the polymer type (not shown) outside the metallic covering layer.

The cable 1 described above is typically suitable for use at depths which may reach approximately 7000 m. In some cases, for example for use in shallow sea areas where fishing takes place, the cable 1 can be provided with an external armour (not shown) consisting of one or more layers of essentially cylindrical reinforcing elements, preferably made from steel, alternating with layers of polymer material, for example polypropylene.

Figure 2:
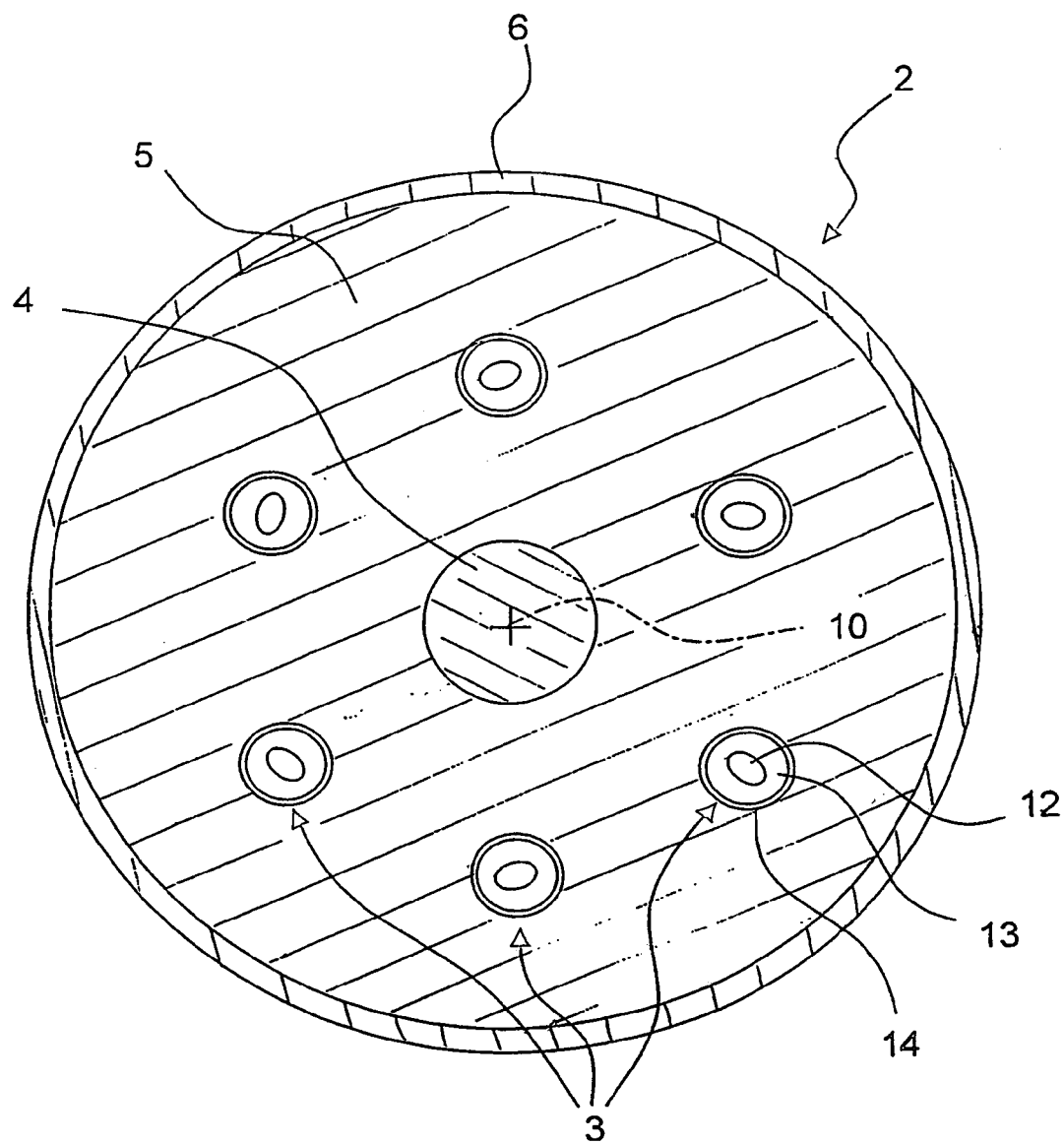
FIG. 2 shows, in an enlarged view and not to scale, the optical core of the cable of FIG. 1.

In FIG. 2, the optical core 2 is shown separately and in an enlarged view. The central element 4 is an essentially filamentary element capable of providing an adequate resistance to the axial stresses in the various stages of production of the cable 1. The central element 4 is preferably made from steel or from a resin reinforced with glass fibres, with reinforcing polymer materials (such as aromatic polyamides, for example Kevlar®) or with carbon fibres or similar, and has a diameter preferably in the range from 0.5 mm to 0.7 mm.

The body 5 forms a continuous support for the optical fibres and is capable of maintaining the optical fibres 3 in a stable position around the central element 4, and also of "absorbing" external stresses acting on the optical core 2. The body 5 can be made from a thermoplastic resin, for example an elastomeric polyester, and can be a homogeneous body without discontinuities, by being formed by a single extrusion process, or can comprise two adjacent layers made by two successive extrusion processes. In the latter case, the fibres are placed on the interface between the two polymer layers. The body 5 has a thickness (measured between the central element 4 and the sheath 6) preferably in the range from 0.9 mm to 1.5 mm, to provide sufficient protection.

The sheath 6 provides thermal and mechanical protection, and is made from a material preferably chosen from the group comprising polyalkylene terephthalates, polyolefins and polyamides, for example polybutylene terephthalate, polyethylene, polypropylene or nylon. The sheath 6 has a thickness preferably in the range from 0.05 mm to 0.15 mm.

Each optical fibre 3 comprises a core 12 through which the optical signals are transmitted, a cladding 13 positioned around the core 12, and an outer protection 14 of acrylic resin formed in one or more layers. The fibres 3 can be single mode or multi-mode. In the first case, they typically have an external diameter of 125 $\mu$m, while in the second case they can have an external diameter of a few hundred microns. In the example of FIG. 2, the optical fibres 3 are placed at equal distances from each other and at the same distance, for example in the range from 0.4 mm to 1.2 mm, from the axis 10, in such a way as to form a single crown of optical fibres. However, the example is not to be considered as limiting, since the fibres could also be positioned in two coaxial crowns. In the case of a single crown, the number of fibres could also be different from that shown, but is preferably less than or equal to twelve (12), while in the case of a double crown the total number of fibres is preferably less than or equal to twenty-four (24).

According to the present invention, the core 12 of the optical fibres 3 (or of a subset of these) has an essentially uniform ellipticity along the fibre, the mean value of the ellipticity being such that there is a birefringence which is at least equal to the birefringence due to cabling (in such a way that the effects of cabling can be opposed), but which is not so high that it causes a greater complexity or an increase in costs of the fabrication or assembly processes, for the reasons described above. This mean ellipticity is in the range from approximately 0.25 to 0.55, preferably from approximately 0.3 to 0.5, more preferably from approximately 0.35 to 0.5, and even more preferably from approximately 0.35 to 0.45.

Additionally, and still according to the present invention, the optical fibres 3 have a spin about their axes which is preferably alternating and which is preferably applied during drawing by the spinning method. This spin gives rise to sufficient modal coupling in the transmitted signals to oppose the effects of the intrinsic birefringence of the fibre introduced by the aforesaid ellipticity of the core. The maximum value of this spin is at least 4 twists per meter, preferably at least 5 twists per meter, more preferably at least 6 twists per meter, and even more preferably at least 10 twists per meter. However, the applicant has observed that above 30 twists per meter it becomes difficult to apply the spin by the spinning method at convenient drawing velocities (particularly at velocities exceeding 10 m/s).

The optical fibres can be placed in straight paths (assuming that the cable is in a straight position), that is they extend parallel to the central element 4, or can extend in cylindrical helix paths of the "closed" or "open" type. In a path of the "closed" type, the direction of winding is always the same (clockwise or anti-clockwise), while in an "open" path (also known as an "SZ" path, and denoted thus below) the direction of winding is reversed, in one direction or in the other, when a predetermined winding angle (preferably greater than or equal to 360°) is reached. Both of these paths lie on a cylindrical surface and are produced by the combination of a translatory motion in a direction parallel to a central axis and a rotary motion (alternating in the case of the SZ path) about the said axis. The SZ path is associated with a reversing pitch P, defined as the distance between two successive reversing points in the direction of rotation, and a winding period p, defined as the distance between two successive points at which the trajectory starts to rotate in the same direction. Usually, the winding period is twice the inversion pitch P. The reversing pitch P is preferably in the range from 0.5 m to 5 m.

The process of fabricating the cable 1 comprises a number of steps. Initially, a process, preferably of the OVD (Outside Vapour Deposition) type, is carried out, to create a preform of glass material. The drawing process is then carried out to form the optical fibre from the preform of glass material. Finally, the cabling process is carried out. Each of these processes is described briefly below.

The OVD process comprises the steps described below.

Figure 3:
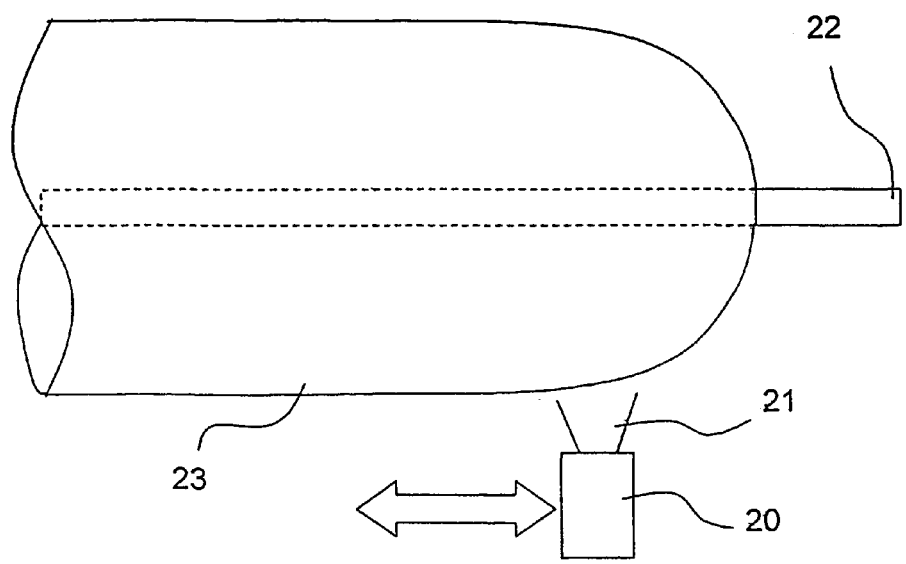
FIG. 3 shows one of the steps of the OVD process for making a preform of glass material.

In a first step, described with reference to FIG. 3, a process of chemical deposition is carried out by means of one or more burners 20, to deposit, on a cylindrical rectilinear support 22 of ceramic material, chemical substances 21 suitable for making an optical fibre. These substances typically comprise silicon and germanium, deposited in the form of oxides ($SiO_2$ and $GeO_2$). The support 22, which typically has a diameter of approximately 5–6 mm, is usually held in a horizontal position, but can alternatively be held in a vertical position. In this way an essentially cylindrical preform 23 of glass material, called the "core preform", is made, and this will subsequently be formed into the core and an inner portion of the cladding of the optical fibre.

The burners 20 are preferably mounted on a structure (not shown), provided with a motorized movement member which can translate them parallel to the support 22. During the first step, the burners 20 are scanned several times parallel to the portion of the support 22 on which the preform is to be grown.

Figure 4:
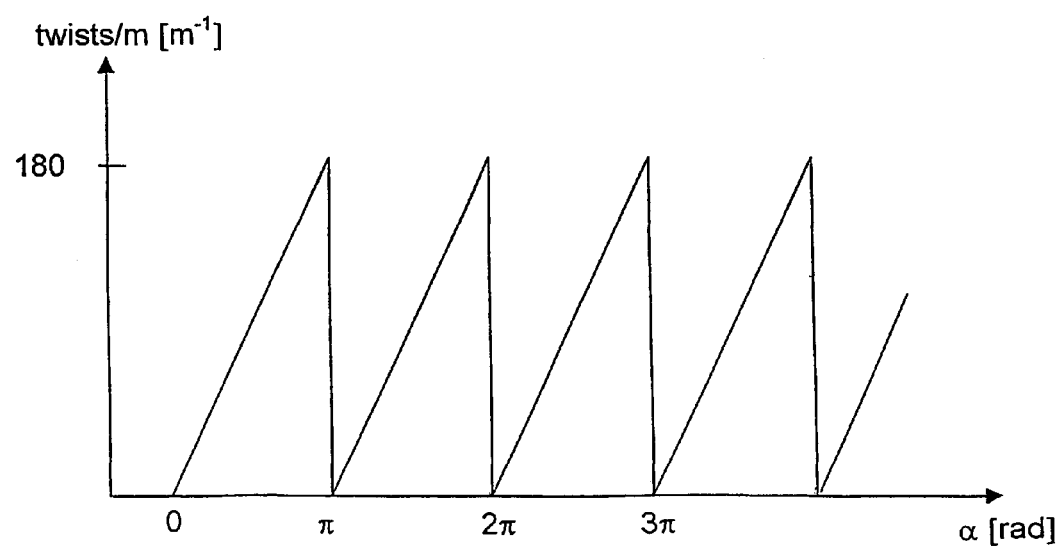
FIG. 4 shows the variation of the angular velocity of the support for the preform during the aforesaid step of the OVD process.

At the same time, the support 22 is made to rotate about its axis by means of a motorized member, in such a way that the whole of its surface is exposed to the flow of reagents. For a predetermined number of scans of the burner 20, forming a fraction X of the total number of scans specified for making the core preform, the angular velocity of the support 22 is varied with a predetermined periodic variation, in such a way as to form an inner portion of the core preform with an elliptical section. The variation of the angular velocity can be, for example, of the type shown in FIG. 4, in other words a sawtooth variation between 0 and 180 r.p.m. and with an angular period of $\pi$. In the subsequent scans, the angular velocity of the support 22 is preferably kept constant and equal to a predetermined value, preferably in the range from 100 to 250 r.p.m., for example 150 r.p.m. The value of X and the variation of the angular velocity are chosen in accordance with the ellipticity of the electromagnetic field which is to be obtained in the optical fibre during the transmission of the signals. For example, it is possible to select a high value of X (up to a maximum of 100%) and a variation of the angular velocity within a range much smaller than that indicated above, thus providing an ellipticity extending essentially over the whole core preform. Another periodic variation, of the sinusoidal type for example, can be selected as an alternative to the sawtooth variation.

During this process, the flow of reagents is varied in such a way as to produce the controlled deposition of the chemical substances 21 and thus obtain the desired refractive index. The profile of the core preform can be, for example, of the type shown (qualitatively) in FIG. 7, in which n is the refractive index and r is the radius. The central part, of triangular shape, is that associated with the portion of preform which will be formed into the core of the optical fibre. This profile can be obtained by the deposition of oxides of silicon and germanium in ratios variable progressively up to the completion of the portion associated with the triangular part, and the subsequent deposition of silicon oxide only. The two steps at the side of the central triangle are produced by adding more germanium oxide for a predetermined time.

In a second step of the OVD process, the rectilinear ceramic support 22 is extracted from the core preform, leaving a central hole in the preform.

In a third step, the core preform is subjected to a process of drying and compaction in a furnace, during which $Cl_2$ and other gases are passed through the central hole in order to eliminate the hydroxide ions (—OH) and the atoms of water present in the preform. Thus a vitrified core preform is obtained, still having a central hole but having a diameter smaller than that of the initial preform (typically approximately 2 mm).

In a fourth step, after the central hole of the core preform has been closed (with a plug, for example) and after a vacuum has been created within it, the vitrified core preform (which typically has a diameter of the order of 50–100 mm)

is placed in a vertical furnace in which a lower end of the preform is melted. The melting of the lower end causes the walls of the hole to collapse because of the vacuum created in the hole. The melted glass material cools to form an elongate cylindrical element (also called the core bar) of a predetermined diameter (typically in the range from approximately 5 to 20 mm), which is drawn downwards by a traction device. This elongate cylindrical element is then further cooled and cut transversely at a plurality of equally spaced points to form a plurality of elongate elements, also known by the term "canes", (with a typical length of the order of one meter).

In a fifth step, each elongate element is subjected to a process of chemical deposition ("overcladding") similar to that of the first step. In particular, a plurality of chemical substances (typically including silicon oxide), which will subsequently form the outermost portion of the optical fibre cladding, are deposited on each element by means of at least one burner. At the end of the process, a final low-density cylindrical preform is obtained: this is called the "final preform", since the optical fibre can then be drawn from this.

In a sixth and final step, the low-density final preform is dried and consolidated by the same processes as those specified for the third step. Thus a vitrified final preform is obtained, ready for the drawing process.

Figure 5:
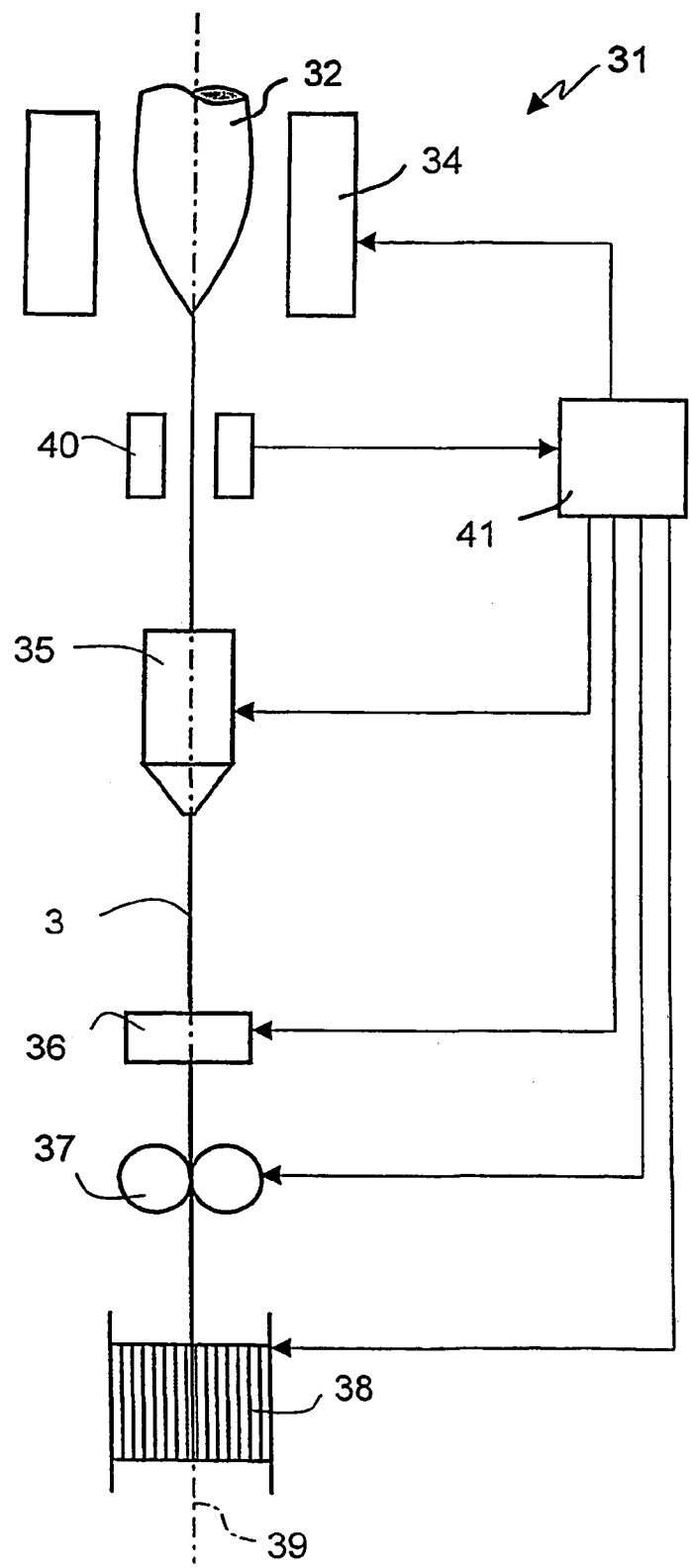
FIG. 5 shows schematically a drawing tower used for producing an optical fibre from the aforesaid preform of glass material.

The drawing process is described below with reference to FIG. 5, which shows a drawing tower 31. The drawing tower 31 can be used to form the optical fibre 3 from the vitrified final preform, indicated here by 32.

The tower 31 comprises a plurality of parts which are essentially aligned along a vertical drawing direction, defined by an axis 39. The choice of a vertical direction is due to the need to use the force of gravity to obtain, from the preform 32, a flow of melted material from which the fibre 3 can be drawn. In particular, the tower 31 comprises:

- a furnace 34 capable of heating the preform 32 beyond its softening point; the furnace 34 can be of any type suitable for producing the controlled softening of a preform, for example one of the type described in U.S. Pat. No. 4,969,941;
- a coating device 35 for applying a protective coating to the optical fibre 3; the coating device 35 can be, for example, of the type described in U.S. Pat. No. 5,366,527;
- a drawing device 37 (for example, one of the single pulley or double pulley type) capable of drawing the optical fibre 3 downwards at a predetermined velocity (corresponding to the drawing velocity); and
- a take-up reel 38 on which the optical fibre 3 is wound at the end of the drawing process.

The tower 31 can also comprise a diameter measuring device 40, positioned between the furnace 34 and the coating device 35 and capable of measuring the diameter of the optical fibre 3 during its passage, before the application of the protective coating. The signal generated by the diameter measuring device 40 can be used, for example, to control the velocity of the drawing device 37 in such a way that an optical fibre 3 of predetermined diameter is obtained.

The tower 1 also comprises a spinning device 36, positioned typically between the coating device 35 and the traction device 37, to impart a predetermined spin to the optical fibre 3. The spinning device 36 is provided with at least one moving member capable of interacting with the optical fibre 3.

For the purposes of the present invention, the term "spin" denotes the ratio between the angular velocity of rotation $d\theta/dt$ of the optical fibre (where $\theta$ is the angle of rotation of the optical fibre measured with respect to a fixed reference) and the velocity of drawing. The spin defined in this way can be measured in twists per meter.

As described above, this predetermined spin is selected in such a way as to generate, in the optical fibre, a coupling (in other words an exchange of power) between the fundamental propagation modes such that the effects of the ellipticity of the fibre core are made uniform in a length of fibre equal to at least the beat length. Thus it is possible to significantly reduce the negative effects, in terms of PMD, caused by the ellipticity of the core.

The spinning device 36 can be, for example, of the type described in patent application WO 9846536 in the name of Corning. In particular, the device 36 can include a pair of rollers (not shown) having surfaces interacting with the optical fibre and having corresponding axes perpendicular to the drawing axis 39, in which at least one roller is moved in an alternating way along its axis, in such a way that an alternating spin is imparted to the optical fibre 3. In particular, the spinning device 36 can impart to the optical fibre 3 an alternating spin with a predetermined maximum value of spin and reversing frequency.

Alternative methods of applying the spin to the fibre 3 are described in U.S. Pat. No. 5,298,047 in the name of AT&T Bell Laboratories and patent application EP 0842909 in the name of FOS. In U.S. Pat. No. 5,298,047, the torque is imparted by suitably moving, with alternate oscillations in the clockwise and anti-clockwise directions, a guide roller of the optical fibre having its axis perpendicular to the axis of advance of the fibre. According to EP 0842909, the torque is imparted by making the device for applying the protective coating rotate during the drawing process, in such a way that the rotation of this device is transmitted to the optical fibre. In the latter case, therefore, the spinning device is associated with the coating device, and is not separate from it as it is in FIG. 5.

The drawing velocity is usually chosen according to the characteristics of the various parts of the drawing tower 31 and, together with the temperature in the furnace 34, determines the diameter of the optical fibre 3. Typical values of this velocity, for a single mode fibre, are in the range from 5 m/s to 20 m/s.

The value of spin to be imparted is chosen in such a way as to produce the birefringence characteristics required by the specifications. In particular, the value of spin is chosen in such a way that there is a considerable number (more than 10, for example) of variations of the orientation of the ellipticity of the fibre in a portion of fibre whose length is equal to one beat length. The b at length (typically in the range from 1 m to 100 m) corresponds to the length of fibre necessary for a given state of polarization to be repeated. In other words, the beat length corresponds to the length of fibre necessary for the two components of the fundamental mode, initially in phase with each other, to be in phase again, on the assumption that the fibre maintains a constant birefringence over this length.

Owing to the spin imparted to the fibre, the energy is remixed between the component modes of the fundamental mode during the transmission of the signals. The applicant has observed that, in order to achieve the objects of the present invention, it is advantageous to impart to the optical fibre, if the normal drawing velocities of an optical fibre are assumed, a spin having a maximum value of at least 4 twists per meter, preferably at least 5 twists per meter, more preferably at least 6 twists per meter, and even more preferably at least 10 twists per meter.

The tower 1 also comprises a control unit 41, connected to the various parts of the tower 1, for the processing of the numerous process parameters and for the automatic control of the various operations of the process.

The drawing process is carried out as follows.

The tower 1 is prepared for drawing by placing the preform 32 in the furnace 34, which has previously been heated to a temperature above the softening point. In the furnace 34, an end portion (known as the "neckdown") of the preform 32 is melted, thus generating a drop of melted material. This drop, under the action of the force of gravity, is elongated downwards, drawing further melted material with it in such a way as to form a filamentary element of flowing material which cools (and is therefore consolidated) progressively. This filamentary element is made to pass through the diameter measuring device 40, the coating device 35, the spinning device 36 and the drawing device 37, and several turns of it are wound on the take-up reel 38.

The drawing device 37, which draws down the optical fibre 3 at a predetermined velocity, causing it to be formed continuously from the neckdown, and the coating device 35, which applies the protective coating to the optical fibre 3 which passes through it, are then activated. At the same time, the spinning device 36 is moved with predetermined values of the reversing frequency and maximum excursion of its moving member, to produce an alternating spin of the optical fibre 3.

The optical fibre 3, having passed through the drawing device 37, is then wound on to the take-up reel 38. The drawing process is continued until a portion of preform of predetermined length has been processed, or until a predetermined length of fibre has been produced.

After the drawing, the optical fibre is usually subjected to a tensile test, also known as the "screening test", in which it is unwound from a first reel (for example, the reel used for the drawing process) and wound on to a second reel, passing along a path with pulleys along which a predetermined tension is applied to the fibre.

The telecommunications fibres are then cabled, in such a way as to produce a supporting structure for the fibres which allows them to be transported, installed and used in predetermined conditions.

As described above, the process of forming the optical cable 1 typically comprises the production of the optical core 2 by an extrusion process, followed by the application of the outer protective and reinforcing layers 7, 11 and 13, where the term "layer" includes that formed by the crowns of metallic elements 7a, 7b and 7c.

Figure 6:
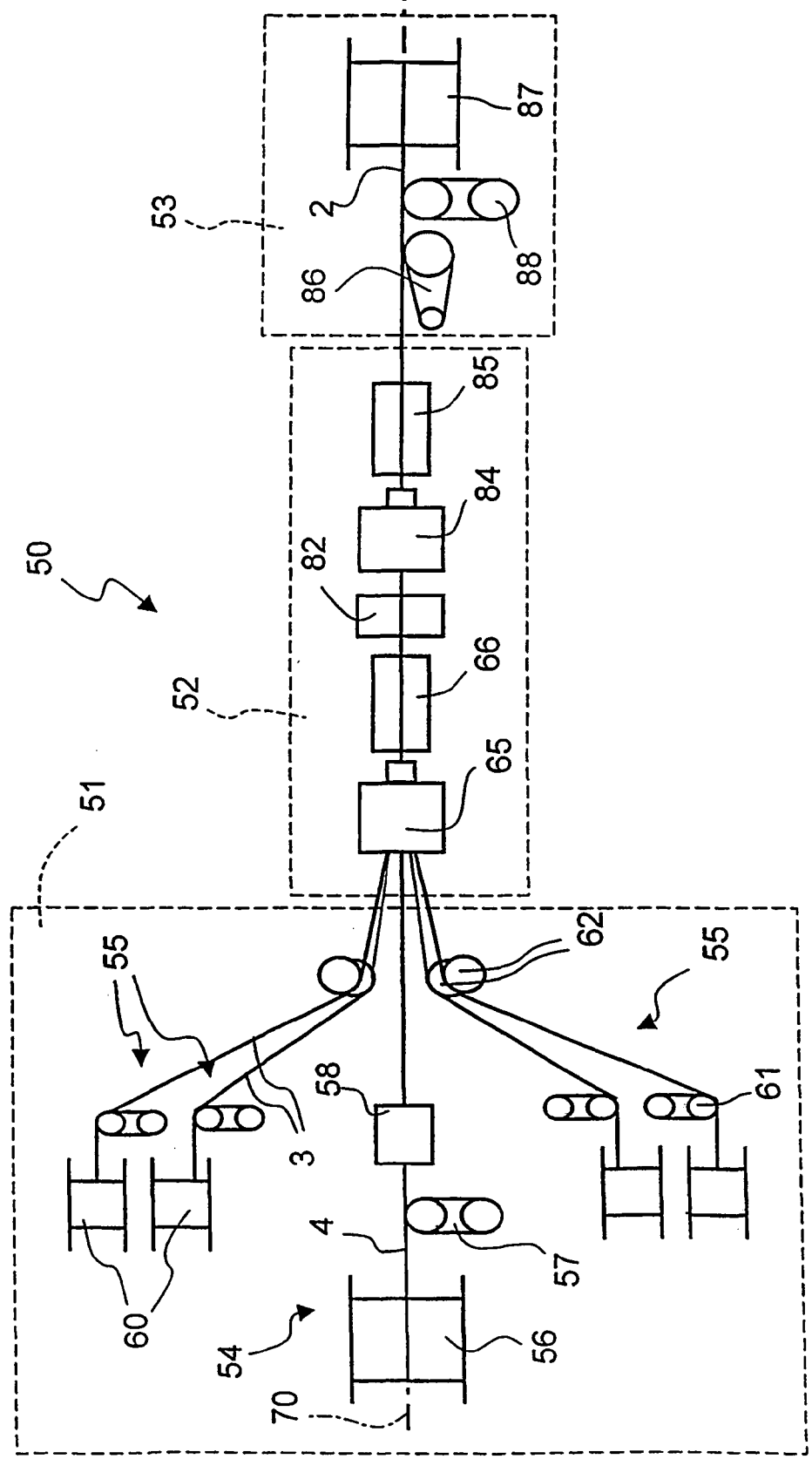
FIG. 6 shows an assembly for cabling optical fibres.

With reference to FIG. 6, the number 50 indicates, as a whole, an assembly for the fabrication of an optical core for a "tight" cable, in this particular case for making the optical core 2.

The assembly 50 comprises, in its essential parts, an unwinding and feed section 51, an extrusion section 52 and a take-up section 53, which follow each other along an essentially rectilinear direction of processing 70.

The feed section 51 comprises a unit 54 and a plurality of units 55 for feeding, respectively, the central element 4 and the optical fibres 3 to the extrusion section 52.

The unit 54 comprises a reel 56 for unwinding the central element 4, and a cushioning device 57 for regulating the unwinding tension of the central element 4. In the case of an "SZ" cable, there may be a spinning device 58, positioned along the direction of processing 70 and capable of imparting a controlled spin of the alternating type to the central element 4 during its passage.

The spinning device 58 can, for example, comprise a motorized rotating member which interacts with the central element 4 during its advance, to impart to it the alternating rotation about its axis.

Each feed unit 55 comprises an unwinding reel 60 of a corresponding optical fibre 3, a cushioning device 61 of a known type for regulating the unwinding tension, and a return pulley 62 for feeding the corresponding optical fibre 3 to the extrusion section 52 in a predetermined direction.

The extrusion section 52 comprises, along the direction of processing 70, a first extruder 65 capable of extruding the polymer material for making the body 5 around the central element 4 and the optical fibres 3, and a first cooling tank 66 for cooling the polymer layer 5 after extrusion. The extrusion section 52 can also comprise a second extruder 84 positioned downstream of the first cooling tank 66 to deposit the protective sheath 6 on the body 5 and a second cooling tank 85 to consolidate the sheath 6. Between the first cooling tank 66 and the second extruder 84 there may be a hot-air drying device 82 to eliminate traces of moisture on the surface of the body 5.

The extruder 65 can include, for example, an extrusion head (not shown) comprising a die coaxial with the axis 70 and capable of guiding the central element 4 and the optical fibres 3 into an extrusion area into which the polymer material is injected for the formation of the optical core 2. In particular, this die can have a central channel for the passage of the central element 4 and a plurality of further channels distributed in a ring around the central channel for the passage of the optical fibres 3.

The take-up section 53 comprises a traction device 86 of a known type, for example a drawing device with continuous pads or a device of the wheel ("capstan") type, capable of drawing the optical core 2 at a controlled velocity. The take-up section 53 also comprises a motorized take-up reel 87 capable of receiving and storing the optical core 2 and a cushioning device 88 located upstream of the take-up reel 87 and capable of regulating the winding tension of the optical core 2.

The assembly 70 operates as follows. The central element 2 and the optical fibres 3 are fed to the extrusion section 52 by the units 54 and 55. In the section 52, the first extruder 65 extrudes the polymer material around the central element 4 and the optical fibres 3, and the first cooling tank 66 cools the body 5 after the extrusion.

The second extruder 84 then deposits the protective sheath 6 on the body 5, and the second cooling tank 85 consolidates the material forming the sheath 6. The drying device 82, if present, eliminates traces of moisture on the surface of the body 5 by means of a jet of hot air.

At the same time, the drawing device 86 draws the optical core 2 at a controlled velocity, and the take-up reel 87 receives and stores the optical core 2. Meanwhile, the cushioning device 88 regulates the winding tension of the optical core 2.

In the case of an "SZ" cable, the spinning device 58 imparts an alternating spin to the central element 4, and both the polymer material and the optical fibres 3 are made to undergo, from the extrusion area, an alternating rotary movement about the direction 70, with a winding angle essentially equal to the angle of rotation of the central element 4. As a result of this rotary movement, the advance at constant velocity along the direction of processing 70 and the special arrangement (in a ring) of the channels in the extrusion die, the fibres 3 are positioned at equal distances from each other along "open" helix paths. In this case, the body 5 of the optical core 2 is free of discontinuities, since it is formed by a single extrusion process and completely incorporates the optical fibres 3 and the central element 4.

Alternatively, the body 5 could be made by two successive extrusion processes and the optical fibres 3 could be positioned on the interface between the two polymer layers formed in this way. For this purpose, the extrusion section 52 could comprise a further extruder and a further cooling tank.

The double extrusion can be carried out, for example, as described in U.S. Pat. No. 4,902,097 in the name of STC PLC. This patent proposes the extrusion of a layer of thermoplastic elastomer around a central element, the heating of this surface beyond its melting point, the incorporation of a plurality of optical fibres in this surface, and the extrusion of a second layer of thermoplastic elastomer to cover the fibres.

The cable described above can be modified or varied without departure from the scop of protection of the present invention.

For example, the cable can comprise fibres of different types, at least one of which has the characteristics described above, while at least one of the remaining fibres can have different characteristics; for example, it can be of a standard type.

Results of Experimental Measurements

Figure 7:
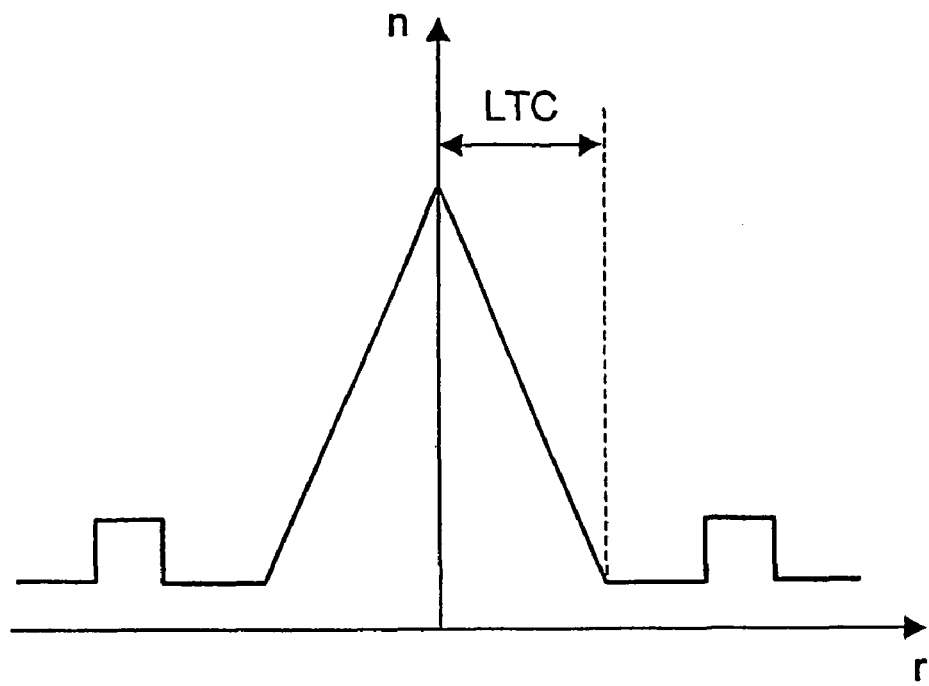
FIG. 7 shows, for guidance, the profile of the refractive index of preforms of glass material used for experimental measurements.

The applicant has used the OVD process described above to make three different core preforms, indicated below as P1, P2 and P3, having a refractive index profile of the "segmented core" type (in other words, one defined by a segmented line) and of the dispersion shifted type, as shown in FIG. 7, and having different values of ellipticity of the innermost portion (from which the core of the fibre is subsequently formed). The principal characteristics of these preforms are summarized in Table 1 below.

TABLE 1

| core preform | X (%) | $\Delta LTC_{max}$ (%) | CO of fibre core (%) | ellipticity of fibre core |
|---|---|---|---|---|
| P1 | 0.5 | 12 | 20 | 0.6 |
| P2 | 0.25 | 7 | 10 | 0.45 |
| P3 | 0.12 | 4 | 5 | 0.3 |

Table 1 shows various values whose significance is described below.

The value X, as described above, represents the fraction of the total number of scans of the burners 20, during the first step of the OVD process, carried out to complete the portion of the core preform having an elliptical section.

The value $\Delta LTC_{max}$ indicates the maximum variation of a parameter known as the "central triangle width" (LTC), which represents the half-length of the base of the central triangle of a refractive index profile such as that shown in FIG. 7, with the variation of the direction along which the profile is measured.

The measurements of $\Delta LTC_{max}$ were made on canes produced from the different core preforms. Since the innermost portion of these preforms has a predetermined ellipticity in cross section, the value $\Delta LTC_{max}$ determined as a function of the variation of the angle of measurement with respect to the axes of the ellipse provides an indication of the ellipticity. The maximum variation of $\Delta LTC_{max}$ is measured as a percentage of the mean value $LTC_{ave}$ of LTC.

Figure 8:
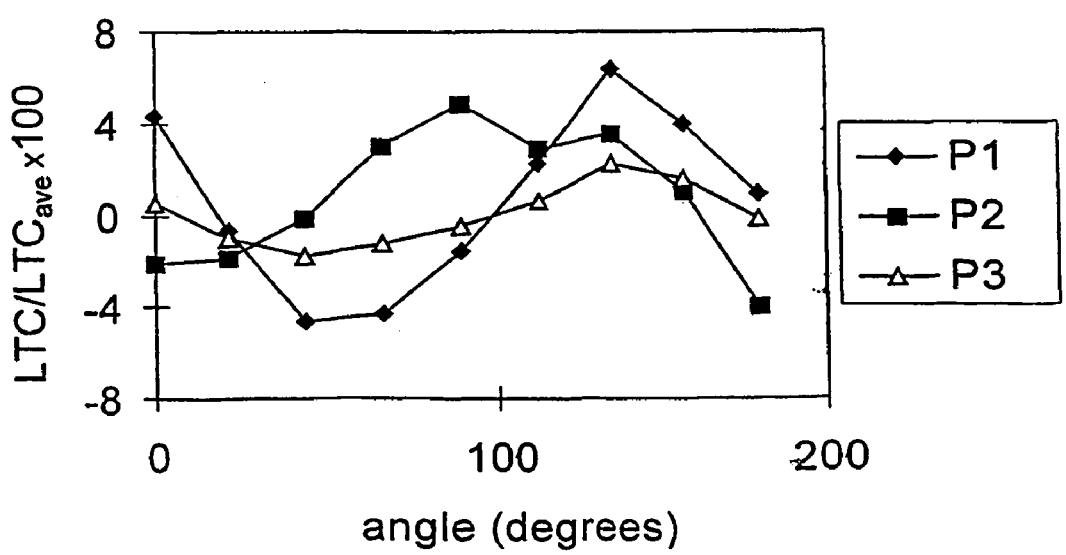
FIG. 8 shows results of experimental measurements.

The measurements of $\Delta LTC_{max}$ were carried out with the P104 measuring instrument produced by the York company, adapted for the analysis of preforms and canes. The operating principle of this instrument is based on the measurement of the deflection of a laser beam which strikes the preform or cane transversely. The deflection of the laser beam is a function of the radial variation of the refractive index. A Hankel transform was carried out to determine the refractive index profile of the preform, or of the cane, from the deflection of the laser beam. The refractive index was reconstructed on the assumption of a cylindrical symmetry of the profile. This meant that the profiles determined by the instrument when the measurement is made at the points of minimum and maximum diameter of the innermost portion (in other words on the minor and major axes of the ellipse) were not exactly the "real" profiles. However, the measurement provided an indication of the ellipticity present in the preform or in the cane, and was normally useful before the execution of step V (overcladding) of the OVD process, described above, and the drawing process. FIG. 8. shows the variation of ($LTC/LTC_{ave}\cdot 100$) with the variation of the angle of measurement, for the canes formed from the preforms P1, P2 and P3, as determined with the aforesaid P104 instrument.

The value of CO, or "core ovality", is a value correlated with the ellipticity e of the core of an optical fibre according to the expression $CO \cong 50\cdot e^2$, and defined as above. The value of CO can be measured directly by using the PK 2400 measuring instrument produced by the Photon Kinetics company, according to the measurement procedure specified by the European standard IEC-793-1-A2. The values shown in Table 1 were measured by this method in specimens of optical fibre formed from the aforesaid canes. In particular, the PK 2400 instrument enables geometrical measurements to be made on the end face of an optical fibre. The measurement is made by passing radiation at 633 nm along a portion of fibre with a length of approximately 2 metres, and measuring the near field distribution of light leaving the aforesaid end of the fibre. In practice, the measuring instrument provides the value of CO directly, by processing the light profile leaving this end (using a "fitting" operation).

The values of ellipticity of the fibre core shown in Table 1 were found, by suitable approximation, from the aforesaid values of CO according to the relation between the two values indicated above.

The applicant has estimated that the birefringence caused by cabling is less than or equal to that due to an ellipticity of 0.3 (such as that of the fibre produced from the preform P3), and less than or equal to half of that due to an ellipticity of 0.45 (such as that of the fibre produced from the preform P2).

The applicant then measured the intrinsic PMD in specimens of fibre formed from the preforms P1, P2 and P3. In the case of the preform P2, two different canes were used, indicated as "cane a" and "cane b". In particular, the measurements were made on a fibre F1 formed from the preform P1, on a fibre F2a formed from the preform P2 and from the cane a, on a fibre F2b formed from the preform P2 and from the cane b, and on a fibre F3 formed from the preform P3. All the specimens were made with a length of 1 km. For each type of fibre, one specimen with spin (with values of spin shown below) and one specimen without spin were made. In the case of the measurement of PMD in fibres with spin, two specimens of fibre with the same spin were used for each of the fibres F2a and F3.

The measurements of PMD were made by means of the CD 3 measuring instrument produced by the EG&G company, and according to the measurement procedure specified by the American standard FOTP-113 ("Polarization-mode dispersion measurement for single-mode optical fibers by wavelength scanning", Telecommunication Industry Association (TIA), 1993). In particular, the measurements were made by passing a test radiation with a variable wavelength through the aforesaid specimens of fibre kept free of tension. A polarizer was present at the output of the fibre, and the light intensity at the output of the polarizer was analysed at the different wavelengths, in such a way as to determine the value of PMD.

The results of the aforesaid measurements of PMD are summarized in Table 2.

TABLE 2

| fibre type | fibre without spin PMD [ps/km$^{1/2}$] | fibre with spin | |
|---|---|---|---|
| | | spin [twists/m] | PMD [ps/km$^{1/2}$] |
| F1 | >1.5 (not measurable) | 6 | >1.5 (not measurable) |
| F2a | 1–1.5 | 5 | 0.32 (field 1) |
| | | 5 | 0.20 (field 2) |
| F2b | ≈0.7 | 20 | 0.07 |
| F3 | 0.2–0.3 | 6 | 0.07 (field 1) |
| | | 6 | 0.10 (field 2) |

It was found that the values of PMD associated with the fibre F1 were not measurable, because they exceeded the limit of measurement of the instrument used.

Where the PMD of fibres without spin is concerned, the ranges of variability or the approximate values of measurements made on a number of specimens are shown. As can be seen, in the case of the fibre F1, which has a core with relatively high ellipticity (0.6), a spin of 6 twists per meter is not sufficient to reduce the PMD to acceptable values.

In the case of the fibre F2a, which has a core ellipticity of 0.45, a spin of approximately 5 twists per meter is sufficient to achieve acceptable values of PMD. The applicant considers that the PMD of this fibre would be even smaller with a spin of more than 10 twists per meter.

In the case of the fibre F2b, which also has a core ellipticity of 0.45, a spin of 20 twists per meter is sufficient to achieve particularly low values of PMD. The applicant considers that, for this fibre, a spin of 10 twists per meter would be sufficient to achieve low values of PMD.

The fibre F3 has a value of ellipticity which can also be reached, locally and irregularly, by standard production (where "standard production" denotes production in which the OVD is carried out with a constant angular velocity of the support 22). For this fibre, a spin of 6 twists per meter is sufficient to provide a low PMD (less than or equal to 0.1 ps/km$^{1/2}$).

To check the fibres' degree of sensitivity (in terms of PMD) to cabling, the measurement of PMD was repeated, with the same method and on the same specimens, after each specimen had been wound onto a reel with a diameter of 300 mm, without overlaps (in other words, in a single layer) and with a tension of 150±10 g. Thus a lateral pressure of approximately 1 g/mm on the fibre is obtained, and this, according to the applicant, simulates with sufficient accuracy the lateral compressive forces due to cabling.

The applicant has also found, by using the information in the article by S. C. Rashleigh, *Origins and Control of Polarization Effects in Single-Mode Fibers, Journal of Lightwave Technology*, Vol. LT-1, No. 2, June 1983, and, in particular, formulae (2) and (10) of this article and the values Δn=0.003 (where Δn is the difference in refractive index between the core and the cladding of the fibre), F=1.5 N (where F is the tension applied to the fibre) and R=150 mm (where R is the radius of the winding reel), that the birefringence caused by the winding onto the reel, which is carried out to simulate the cabling condition, is approximately equal to that due to an ellipticity of 0.3 (such as that of the fibre produced from the preform P3), and approximately half of that due to an ellipticity of 0.45 (such as that of the fibre produced from the preform P2). This confirms the estimate made previously with respect to the comparison between the values of birefringence due to cabling and those caused by the ellipticity of the fibre core.

The aforesaid measurements were made on the fibres F2a, F2b, F3, and, for the purpose of comparison, on an STD fibre of the dispersion shifted (DS) type produced by the standard deposition process (and with the application of the spin during drawing). The results of these measurements are shown in Table 3. Table 3 also shows, again for comparison, the values measured previously in these fibres for a tension of practically zero.

TABLE 3

| fibre type | PMD [ps/km$^{1/2}$] zero tension | PMD [ps/km$^{1/2}$] tension 150 g |
|---|---|---|
| STD | 0.08 | 0.17 |
| | 0.07 | 0.20 |
| F2a | 0.32 | 0.30 |
| | 0.20 | 0.21 |
| F2b | 0.07 | 0.11 |
| F3 | 0.07 | 0.11 |
| | 0.10 | 0.11 |

As can be seen, whereas a standard cabled fibre has a PMD which is more than twice the PMD of the same fibre before cabling, in the case of the fibres made by the method of the present invention the cabling process does not cause a significant increase in the PMD of the fibre. Thus there is a double advantage: in the first place, the values of PMD of the cabled fibres can be kept low; secondly, the values of PMD of the cabled fibres are predictable with a good degree of accuracy.

The experimental measurements show, in particular, that for values of mean ellipticity of the fibre core in the range from 0.3 to 0.45, and for values of spin in excess of 5÷6 twists per meter, the PMD in the cabled fibre is comparable with the PMD in the fibre which has not been cabled.

The applicant considers that the advantages of the present invention are present in all cases for values of ellipticity in the range from 0.25 to 0.55, preferably from approximately 0.3 to 0.5, more preferably from approximately 0.35 to 0.5, and even more preferably from approximately 0.35 to 0.45, and for values of spin of at least 4 twists per meter, preferably at least 5 twists per meter, more preferably at least 6 twists per meter, and more preferably at least 10 twists per meter.

The sensitivity to lateral pressure is estimated to be less than half of that of the fibres with ellipticity typically present in the fibres made by the ordinary OVD and drawing processes.

The applicant has found that the other optical performance characteristics of the fibres F2a, F2b and F3 are essentially similar to those of the STD fibres produced by the standard process. The applicant has also found that the joining of two fibres with a core ellipticity of approximately 0.45, carried out by the typical methods for joining fibres with essentially cylindrical cores, results in coupling losses of less than 0.1 dB. Finally, the applicant has observed that the degree of ellipticity required for the fibres according to the present invention is not such that it has a negative effect on the control of the optical specifications of the fibre during its fabrication.

What is claimed is:

1. An optical cable for telecommunications, comprising an optical core housing a plurality of optical fibres, at least one of said optical fibres having a spin about its own axis with a maximum value of at least 4 twists per meter, and comprising a core having a mean ellipticity in the range of approximately 0.25 to approximately 0.55.

2. The optical cable according to claim 1, wherein said mean ellipticity is in the range of approximately 0.3 to approximately 0.5.

3. The optical cable according to claim 1, wherein said mean ellipticity is in the range of approximately 0.35 to approximately 0.45.

4. The optical cable according to claim 1, wherein said optical core comprises a body of polymer material incorporating said at least one of said optical fibres.

5. The optical cable according to claim 1, further comprising reinforcing elements arranged around said optical core and at least one protective layer placed around said reinforcing elements.

6. An optical cable for telecommunications, comprising an optical core housing a plurality of optical fibres, at least one of said optical fibres having a predetermined spin about its own axis and comprising a core having a mean ellipticity of at least 0.25, said spin and said mean ellipticity being such that the PMD of the fibre is less than or equal to approximately 0.2 ps/km$^{1/2}$.

7. A method for making an optical cable for telecommunications, comprising the steps of:
(a) producing at least one optical fibre, which in turn comprises the steps of making at least one preform of glass material and drawing said at least one optical fibre from said at least one preform;
b) making a body of polymer material containing said at least one optical fibre;
the step of producing at least one preform comprising the adjustment of process parameters in such a way that said preform has, in an inner portion thereof, a mean ellipticity in the range of 0.25 to 0.55, and the step of drawing said optical fibre comprising the step of imparting to said optical fibre a spin having a maximum value of at least 4 twists per meter.

8. The method according to claim 7, wherein said spin is an alternating spin.

9. The method according to claim 7, wherein the step of making said preform comprises depositing chemical substances on a cylindrical support rotating about its own axis, and the step of adjusting process parameters comprises the step of varying the velocity of rotation of said cylindrical support in a periodic way.

10. The method according to claim 7, further comprising the step of making at least one protective and/or reinforcing element outside said body of polymer material.

11. The method according to claim 7, wherein the step of producing at least one preform comprises executing an OVD process.

12. A method for making an optical cable for telecommunications, comprising the steps of:
(a) producing at least one optical fibre, which in turn comprises the steps of making at least one preform of glass material and drawing said at least one optical fibre from said at least one preform; and
(b) making a body of polymer material containing said optical fibre;
the step of producing at least one preform comprising the adjustment of process parameters in such a way that said preform has, in an inner portion thereof, a mean ellipticity of at least 0.25, and the step of drawing said optical fibre comprising the step of imparting a predetermined spin to said optical fibre, said mean ellipticity and said spin being such that the PMD of the said optical fibre is less than or equal to approximately 0.2 ps/km$^{1/2}$.

13. An optical fibre for an optical cable, comprising a core for the transmission of optical signals and a cladding formed around said core, said optical fibre having a spin about its own axis with a maximum value of at least 4 twists per meter and said core having a mean ellipticity in the range of approximately 0.25 to approximately 0.55.

14. The optical fibre according to claim 13, wherein the mean ellipticity is in a range of approximately 0.3 to approximately 0.5.

15. The optical fibre according to claim 13, wherein the mean ellipticity is in a range of approximately 0.35 to approximately 0.45.

16. A method for making an optical fibre for an optical cable, comprising the steps of
(a) producing a preform of glass material; and
(b) drawing said optical fibre from said preform,
the step of producing said preform comprising the step of adjusting process parameters in such a way that said preform has, in an inner portion thereof, a mean ellipticity in the range of approximately 0.25 to approximately 0.55, and the step of drawing said optical fibre comprising the step of imparting to said optical fibre a spin having a maximum value of at least 4 twists per meter.

17. The method according to claim 16, wherein the spin is an alternating spin.

18. The method according claim 16, wherein the step of producing said preform comprises depositing chemical substances on a cylindrical support rotating about its own axis, and the step of adjusting process parameters comprising the step of varying the velocity of rotation of said cylindrical support in a periodic way.

19. The method according to claim 16, wherein the step of producing a preform comprises executing an OVD process.

20. The method according to claim 16, wherein the spin has a maximum value of at least 10 twists per meter.

* * * * *

UNITED STATES PATENT AND TRADEMARK OFFICE
CERTIFICATE OF CORRECTION

| | |
|---|---|
| PATENT NO. | : 7,016,576 B2 |
| APPLICATION NO. | : 10/451998 |
| DATED | : March 21, 2006 |
| INVENTOR(S) | : Franco Cocchini et al. |

It is certified that error appears in the above-identified patent and that said Letters Patent is hereby corrected as shown below:

On the Title Page, Item (74), in the "*Attorney, Agent, or Firm*", line 1, "Finnegaon, " should read --Finnegan,--.

*On the Title Page, Item (57), in the Abstract, line 3, "avers" should read --layers--.

In claim 18, column 20, line 46, "according claim 16," should read --according to claim 16,--.

Signed and Sealed this

Fifth Day of September, 2006

JON W. DUDAS
*Director of the United States Patent and Trademark Office*